United States Patent [19]
Suarez et al.

[11] 3,867,976
[45] Feb. 25, 1975

[54] ELECTROFLUX MELTING METHOD AND APPARATUS

[75] Inventors: Francis Sardovia Suarez; William Lawrence Mankins, both of Huntington, W. Va.; James Earl Roberts, Proctorville, Ohio

[73] Assignee: The International Nickel Company, Inc., New York, N.Y.

[22] Filed: Nov. 29, 1972

[21] Appl. No.: 310,235

[52] U.S. Cl.................. 164/52, 164/68, 164/252, 164/259
[51] Int. Cl............................................ B22d 27/02
[58] Field of Search .......... 164/66, 68, 259, 50, 32, 164/250, 252; 219/73, 74, 126, 146

[56] References Cited
UNITED STATES PATENTS

| | | | |
|---|---|---|---|
| 3,200,232 | 8/1965 | Danhier | 219/73 |
| 3,400,206 | 9/1968 | Barth | 13/18 |
| 3,458,681 | 7/1969 | Wilson | 219/146 X |
| 3,471,626 | 10/1969 | DeWeese et al. | 13/1 |
| 3,692,971 | 9/1972 | Kniepkamp | 219/146 X |
| 3,776,294 | 12/1973 | Paton et al. | 164/52 |

OTHER PUBLICATIONS

Electroslag Remelting, Medovar et al., 1963, pp. 79–90.

Primary Examiner—Francis S. Husar
Assistant Examiner—John E. Roethel
Attorney, Agent, or Firm—Ewan C. MacQueen

[57] ABSTRACT

Apparatus and process for electroflux melting of metal with a flow of inert gas passing through the molten flux.

8 Claims, 1 Drawing Figure

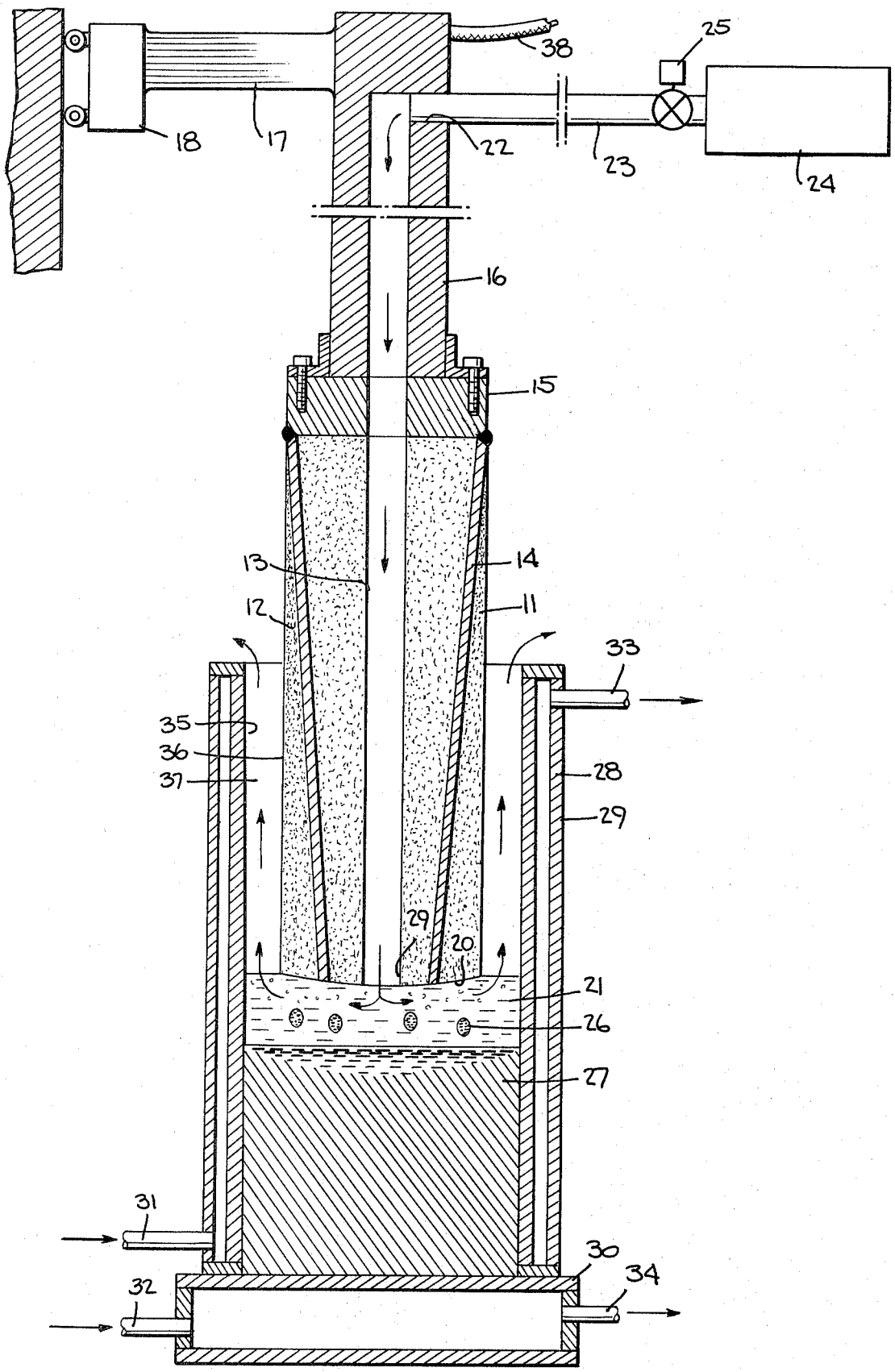

3,867,976

ELECTROFLUX MELTING METHOD AND APPARATUS

The present invention relates to melting of metals and more particularly to electroflux melting.

The metallurgical art is generally aware of electroflux melting processes, sometimes referred to as electroslag melting, wherein metal is melted by electric resistance heating while electric current is passed between an electrode and a molten bath of flux in contact with the electrode. In some instances the metal to be melted is provided as a consumable electrode that is fed downwardly into the molten flux; additional metal for melting may be fed into the melting zone through the heated molten flux. Or, a nonconsumable electrode may be used for heating the flux while the metal charge is fed into the flux. Usually the melted metal is solidifed into an ingot beneath the flux and thereafter the ingot is worked, e.g., rolled, forged, or extruded, to produce wrought products for fabrication of useful articles. In the production of ingots, electroflux processes have been utilized for melting metals such as steel and also for melting more highly reactive metals, e.g., titanium or molybdenum. For instance, consumable electrodes of titanium are melted to produce workable titanium ingots.

Of course, as in most melting processes, purity of the electroslag melted product is a desirable goal and efforts have been made toward developing the process in order to avoid introduction of impurities and, even more desirably, to enable removing impurities in order to produce refined purified metal. Thus, refining, including removal of undesired gases, e.g., hydrogen, oxygen and nitrogen, has been an important object of electroslag melting, especially in the melting of titanium sponge, or other metals susceptible to having an undesirably high gas content. Heretofore, the needs for removal of gases from titanium have presented especially difficult problems. Although attempts have been made to avoid gases in the metal product by flooding the melting chamber above the flux with inert gases, such methods insofar as we are aware have not been entirely successful. As another alternative, titanium is double vacuum melted to remove gases; however, double vacuum melting is undesirably expensive.

With the present invention it has been discovered that metal products having desirably high purity, including low gas content are obtained with an electroflux melting process wherein an inert gas is passed through the flux; the gas is advantageously introduced through a passage in the electrode exiting at the interface of the electrode and molten slag.

It is an object of the present invention to provide apparatus for electroslag melting.

Other objects and advantages of the present invention will be apparent from the following description taken in conjunction with the accompanying drawing which illustrates electroslag melting in accordance with the invention.

The present invention contemplates electroflux melting of metal with an inert gas slowly flowing, or bubbling, through the molten flux in the metal-melting zone to remove unwanted gas from the flux and consequently avoid undesirably high gas content in the melted metal. The invention especially serves to remove gases or other impurities from the metal and thereby refine the metal that is being melted. It is an advantage that the invention can be accomplished with the melt at atmospheric pressure, which can be done in an open crucible, such as a mold, furnace or other open container adapted for holding molten metal. Accordingly, gas-tight chambers are not required and costs, maintenance, explosion hazards and other difficulties often associated with sealed gas-tight chambers are obviated. In certain advantageous embodiments, a consumable electrode has a gas passage continuously through the electrode and a flow of inert gas under low pressure moves through the passage, emerges from the passage at the melting end of the electrode in contact with the flux and then bubbles (or slowly flows) through the flux and above the molten metal. Thereafter the gas emerges from the flux and is free to exit from the mold to the atmosphere through the space between the electrode and the wall of the mold.

An advantageous embodiment of the invention is depicted in the accompanying drawing when taken in conjunction with the following description. Thus, the drawing shows electroflux resistance melting apparatus 10 which comprises a hollow electrode and a mold and depicts the hollow electrode suspended in contact with and slightly immersed in a layer of molten flux that is in the mold. Transverse cross sections of the electrode, mold and the space between the mold and the electrode, and also of the stub and electrode holder referred to hereinafter, are annular. Referring to the drawing, electrode 11 is composed of compacted metal particles 12 and has internal gas passage 13 and electrical conductor strips 14 extending the full length of the electrode. The electrode and the conductors 14 are attached to stub 15 by welds. The stub and the conductors are made of essentially the same metal as the electrode to avoid contamination of the melt. The stub is bolted with a flange coupling to electrode holder 16 which is held, e.g., with a clamp, by carrier arm 17 of electrode feed mechanism 18. The electrode feed mechanism is adapted to move the electrode vertically and control movement of the electrode so that the lower end of the electrode is continuously in contact with or immersed to a controlled depth in the molten flux during the melting of the electrode. The lower end of the electrode around passage 13 forms orifice 19 at interface 20 between the electrode and the flux layer 21. Passage 13 is continuous through stub 15 and holder 16, which has gas entrance port 22 communicating between the passage and the exterior of the holder. Gas conduit 23 is connected between the entrance port and inert gas source 24. The gas conduit is flexible and of sufficient length to enable transmitting inert gas from the source into the entrance port. Regulator 25 provides control over the pressure and rate of flow of the inert gas.

The molten flux 21, molten metal 26 and solidified metal 27 are contained in water-cooled mold 28 which comprises mold shell 29 and water-cooled base 30. Cooling water entrances are provided at shell entrance 31 and base entrance 32; cooling water leaves the mold at water exits 33 and 34, respectively, as shown on the drawing by arrows. Mold face 35 and electrode side surface 36 form annular space 37 where gas can flow outwardly from the flux and mold.

Electric power for melting is applied to the flux from an electric power source through power lead 38 to the electrode holder and thence through the stub and through the electrode, mainly through the conductors, and is conducted across the interface between the electrode and the flux to the mold.

Inert gas, as indicated by arrows beginning at the inert gas source, flows through the passage, emerges at the orifice 19 and then sweeps (bubbles, slowly flows, or similarly) through the flux and emergizes between the electrode and the mold shell in the annular space which is open to the atmosphere. If desired, a baffle may be provided near the top of the mold to block drafts.

Compacted particle electrode 11 is porous, and some inert gas passes somewhat sidewardly through the walls of the electrode and provides additional purging of the space between the electrode and the mold. However, the mold is definitely not sealed from the atmosphere and thus the upper surface of the flux is at a pressure of about one atmosphere. Inasmuch as the flow of inert gas below the electrode is discontinuous, as in bubbles, or is moving slowly in small streams, the gas flow does not substantially interfere with conduction of electric power from the electrode to the slag and the electrode metal is melted off from the electrode, which may be in droplets as illustrated in the drawing.

For practice of the present invention, the electrode can be a consumable electrode made of compacted particulate metal, including powder, sponge or pieces of wrought or cast metal, or can be of wrought or cast metal, e.g., a previously melted and solidified ingot. Advantageously, consumable electrodes of titanium sponge are compacted to a density of at least 50%.

Where the electrode material does not have good electrical conductivity, special electrical conductors of compatible metals are provided in the electrode. For instance, an electrode composed of titanium sponge compacted to 50% density is provided with conductor strips of wrought titanium; on the other hand, an electrode composed of nickel powder compacted and sintered to 95% (or possibly lower, e.g., 70%) density has satisfactory electrical conductivity and is used without a special conductor.

Argon is advantageous for the inert gas from the viewpoint of cost and good density for bubbling through the flux. Use of other inert gases, e.g., helium, is also contemplated.

Introduction of the inert gas into the flux through an orifice at the lower end of the electrode is beneficial for accomplishing especially effective flowing contact of the gas with the flux in the heating and melting zone of the flux bath. Control of the rate of flow of the gas to obtain a bubbling flow is advantageous for efficient utilization of the gas in purifying and refining the metal. Yet, the best rate of gas flow through the passage depends on the sizes of the passage and orifice, and possibly the characteristics of the flux, and thus can vary according to the geometry and scale of operation. Adjustment of gas flow is desirably coordinated with electrode voltage to obtain stable operating voltage characteristics. High pressures and rates of flow of gas that would penetrate the metal, or force the flux away from the electrode, or agitate the molten metal and produce turbulence in the slag or metal are especially avoided.

Alternatively or simultaneously, inert gas may be transmitted and introduced into the flux outside of the electrode. For instance, the apparatus may be adapted to direct inert gas through an electrically insulated conduit and into the flux at an exterior peripheral surface of the electrode, or an independent movable conduit may be provided for directing the gas into the slag.

The following illustrative examples are given for the purpose of giving those skilled in the art a better understanding and appreciation of the advantages of the invention.

Example I

A consumable electrode of compacted titanium sponge was prepared by pressing titanium sponge in a longitudinally split die having a cylindrical cavity and an axially disposed core rod for forming a round hole longitudinally through the center of the cylindrical titanium compact (the electrode). Two strips of commercially pure wrought titanium, each with a width of about one-third the diameter of the electrode and extending the entire length of the electrode, were placed in the die cavity before pressing. Removal of the core rod after compaction provided a round hole about one-half inch diameter through the center of the electrode, thus providing a passage for the inert gas. A titanium stub having an annular cross section, with an axial passage, corresponding to the compacted electrode was welded to one end of the electrode and particularly to ends of each of the titanium conductor strips. The stub was bolted to the electrode holder of an electroflux melting apparatus comprising a DC power source and a water-cooled metal mold having a copper mold shell with a water jacket and a water-cooled copper base plate. To prevent possible damage to the base plate, a titanium starter plate was laid over the copper base plate and an asbestos gasket was provided between the mold and the starter plate to help prevent flux run out. Fine pieces of titanium sponge were placed in the bottom of the mold to aid the start-up. The electrode was inserted in the mold and prefused crushed high-purity acid-grade calcium fluoride was placed in the mold-electrode annulus. Prior to turning on the power, the mold was flushed with argon from the central passage through the electrode. Reversed polarity DC electric power was passed through the electrode and starter plate to melt the crushed flux and establish a molten bath of calcium fluoride flux, meanwhile maintaining a flow of argon from the electrode orifice. Full melting power was then applied to the electrode. (However, it should be understood that the electroflux melting could have been started with flux that was melted outside the mold and then poured into the mold.) Thus, the consumable electrode was melted at the end in the flux bath and was gradually lowered into the mold while being consumed by melting and thereafter solidifying to an ingot under the flux bath. During melting of the consumable titanium electrode, argon flow through the half-inch diameter internal passage was maintained at about 15 cubic feet per hour. Argon flow through the flux over the molten metal was very satisfactory, and, as indicated by stable electrical operation and by subsequent chemical analysis, was successful for refining the melted titanium. After the melted titanium was solidified to form an ingot, specimens for chemical analysis were taken from the ingot. Results of chemical analysis of the titanium sponge used in the compacted sponge electrode and of the electroslag melted ingot metal of the present Example I for Titanium content were, in parts per million (ppm) as follows: Titabium sponge (electrode material) 82 ppm hydrogen, 430 ppm oxygen, 40 ppm nitrogen; ingot of Example I - 67 ppm hydrogen, 350 ppm oxygen, 35 ppm nitrogen. Thus, it is evident that electroslag melting in accordance with the invention accomplished a decrease in the hydrogen, oxygen and nitrogen content of the titanium while producing a titanium ingot from titanium sponge. Metallurgical inspection of the ingot indicated that it was satisfactory for rolling or otherwise working into wrought products.

EXAMPLE II

Nickel powder of 99.0% purity with a particle size of about 5 to 6 microns was compacted and sintered to make two electrodes (Electrodes A and X) each 2 ¾-inch diameter by 36 inch long and characterized by a density of about 96%. (Electric conductor strips were not needed and not provided.) A half inch diameter hole was drilled longitudinally through the center of Electrode A to form a gas flow passage, whereas, Electrode X remained a solid electrode.

Electrodes A and X were electroflux melted to produce 4 inch diameter ingots while using barium fluoride as a flux in a water-cooled mold and an argon flow of 25 cubic feet per hour. During the electroflux melting of Electrode A, which was done according to the invention, the argon flow was introduced down through the central passage in the electrode and flowed through the flux. In contrast, and not according to the invention, the argon flow was introduced down into the space between the mold and the electrode (mold-electrode annulus) above the flux and was not passed through the flux during the electroflux melting of Electrode X.

For purposes of comparing the gas content of the resulting metal, the ingots produced using Electrode A with argon passed through the flux (Ingot A) and using Electrode X with argon above but not passed through the flux (Ingot X) were each cut in half longitudinally and visually examined. Ingot A was satisfactorily dense and free from detrimental gas pockets, whereas Ingot X had many (averaging at least one per square inch of cut surface) voids with shiny smooth interior surfaces characteristic of gas pockets. Thus, the process for making Ingot A was deemed clearly superior to the process of making Ingot X.

In addition to production of titanium or nickel ingots, the present invention is also applicable to ingots of other metals, such as steel, zirconium and cobalt.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. In an electroflux melting process wherein metal is melted in a container by heat from an electric current passing between an electrode and a bath of molten flux in the container and in contact with the electrode, the improvement comprising passing a flow of inert gas through the molten flux in a metal-melting zone of the flux bath.

2. An electroflux melting process for melting metal comprising conducting electric current across the interface between an electrode and a molten bath of an electrically conductive flux in a container, heating the flux to a temperature of at least the melting temperature of the metal to be melted, introducing said metal into contact with the heated flux, melting the metal in contact with the flux and passing a flow of inert gas through at least a portion of the molten flux bath while melting the metal.

3. A process as set forth in claim 2 wherein the electrode is composed of the metal to be melted and the inert gas is transmitted to the flux bath through a passage in the electrode and exits from the electrode and into the flux bath through an orifice in the electrode at the interface of the electrode and the flux bath and wherein the electrode is progressively fed into and melted in the flux bath.

4. A process as set forth in claim 3 wherein electric current is transmitted through electrical conductor strips in the electrode.

5. A process as set forth in claim 3 wherein the electrode metal is nickel.

6. A process as set forth in claim 3 wherein the electrode metal is titanium.

7. In an electroflux melting apparatus having a container adapted for holding molten metal and a bath of molten flux and also having an electrode adapted for melting metal with heat from an electric current conducted between the electrode and a molten flux bath disposed in the container and in contact with the electrode and in contact with the electrode and in contact with the metal to be melted, the improvement comprising means for passing a flow of inert gas through at least a portion of a molten flux bath in the container.

8. An apparatus as set forth in claim 7 wherein the electrode is the metal to be melted and the gas flow means is a passage in the electrode with an exit at the place where the electrode metal is to be melted.

* * * * *

UNITED STATES PATENT OFFICE
CERTIFICATE OF CORRECTION

PATENT NO. : 3,867,976
DATED : February 25, 1975
INVENTOR(S) : Francis Sardovia Suarez; William Lawrence Mankins and James Earl Roberts It is certified that error appears in the above-identified patent and that said Letters Patent are hereby corrected as shown below:

Col. 1, between lines 54 and 55, insert the following paragraph:

--Another object of the invention is to provide apparatus for electroslag melting.--

Col. 3, line 6, for "emergizes" read --emerges--.

Col. 4, line 62 for "Titanium" read --gas--.

Line 63, for "Titabium" read --Titanium--.

Col. 5, line 10, for "99.0%" read --99.9%--.

Col. 6, line 43, (line 7 of claim 7) delete the repetition of the words "with the electrode and in contact", second occurrence.

Signed and Sealed this second Day of September 1975

[SEAL]

Attest:

RUTH C. MASON
Attesting Officer

C. MARSHALL DANN
Commissioner of Patents and Trademarks